(12) United States Patent
Van Kooten

(10) Patent No.: US 9,145,989 B1
(45) Date of Patent: Sep. 29, 2015

(54) SPRINKLER SYSTEM COUPLER

(76) Inventor: Dwayne Van Kooten, Denver, CO (US)

(*) Notice: Subject to any disclaimer, the term of this patent is extended or adjusted under 35 U.S.C. 154(b) by 664 days.

(21) Appl. No.: 13/435,782

(22) Filed: Mar. 30, 2012

(51) Int. Cl.
*F16L 27/12* (2006.01)
*F16L 15/02* (2006.01)

(52) U.S. Cl.
CPC *F16L 15/02* (2013.01); *F16L 27/12* (2013.01)

(58) Field of Classification Search
CPC .................................. F16L 27/12; F16L 15/02
USPC .................................................. 285/302, 303
See application file for complete search history.

(56) References Cited

U.S. PATENT DOCUMENTS

| | | | |
|---|---|---|---|
| 48,709 A | 7/1865 | Emory | |
| 774,788 A | 11/1904 | Schneider | |
| 883,941 A | 4/1908 | Eagan et al. | |
| 988,423 A | 4/1911 | Wittekopf | |
| 1,301,244 A * | 4/1919 | Ford | 285/316 |
| 1,307,273 A | 6/1919 | Salley | |
| 1,851,992 A | 4/1932 | Smith | |
| 1,996,855 A | 4/1935 | Chestwright | |
| 2,046,330 A * | 7/1936 | Leoffert | 285/302 |
| 2,246,436 A | 6/1941 | Downey | |
| 2,359,846 A * | 10/1944 | Hayman | 285/32 |
| 2,516,743 A | 7/1950 | Allin | |
| 2,672,924 A | 3/1954 | Anthes | |
| 2,899,218 A * | 8/1959 | Creighton | 285/302 |
| 2,922,667 A | 1/1960 | Lanciano | |
| 2,968,440 A * | 1/1961 | Cone | 285/302 |
| 3,032,358 A | 5/1962 | Rolston | |
| 3,667,785 A | 6/1972 | Kapeker | |
| 3,740,061 A | 6/1973 | Jensen | |
| 4,281,856 A | 8/1981 | Litman et al. | |
| 4,434,811 A | 3/1984 | Murdoch | |
| 4,659,116 A | 4/1987 | Cameron | |
| 4,678,031 A | 7/1987 | Blandford et al. | |
| 4,905,766 A | 3/1990 | Dietz et al. | |
| 5,002,318 A * | 3/1991 | Witter | 285/302 |
| 5,029,904 A | 7/1991 | Hunt | |
| 5,039,133 A | 8/1991 | Albrecht | |
| 5,046,763 A | 9/1991 | Martucci et al. | |
| 5,403,046 A * | 4/1995 | Kooten | 285/319 |
| 5,462,311 A | 10/1995 | Cipolla | |
| 5,624,139 A * | 4/1997 | Van Kooten | 285/302 |
| 6,016,592 A | 1/2000 | Lavander | |
| 6,152,495 A | 11/2000 | Hoffmann et al. | |
| 6,158,784 A | 12/2000 | Lavender | |
| 6,395,222 B1 | 5/2002 | van Meerveld et al. | |
| 6,520,547 B2 | 2/2003 | Robinson | |
| 7,011,345 B2 | 3/2006 | Foos | |
| 7,198,303 B2 | 4/2007 | Brophy, III et al. | |
| 7,566,076 B2 | 7/2009 | Bryan | |
| 7,922,215 B2 | 4/2011 | Salomon-Bahls et al. | |
| 2008/0142228 A1* | 6/2008 | Harvey et al. | 166/378 |

* cited by examiner

*Primary Examiner* — David E Bochna
(74) *Attorney, Agent, or Firm* — Ramon L. Pizarro; Edwin H. Crabtree

(57) ABSTRACT

An extendible coupling for replacing damaged sections of tubing used in underground sprinkler systems is disclosed. The disclosed coupler includes a pair of telescoping sections and a threaded connection between the two sections. The threaded connection is used to cause the telescoping sections to move relative to one another, causing the coupler to extend and causing nipples used at ends of the coupler to extend into the sections of tubing being joined.

4 Claims, 4 Drawing Sheets

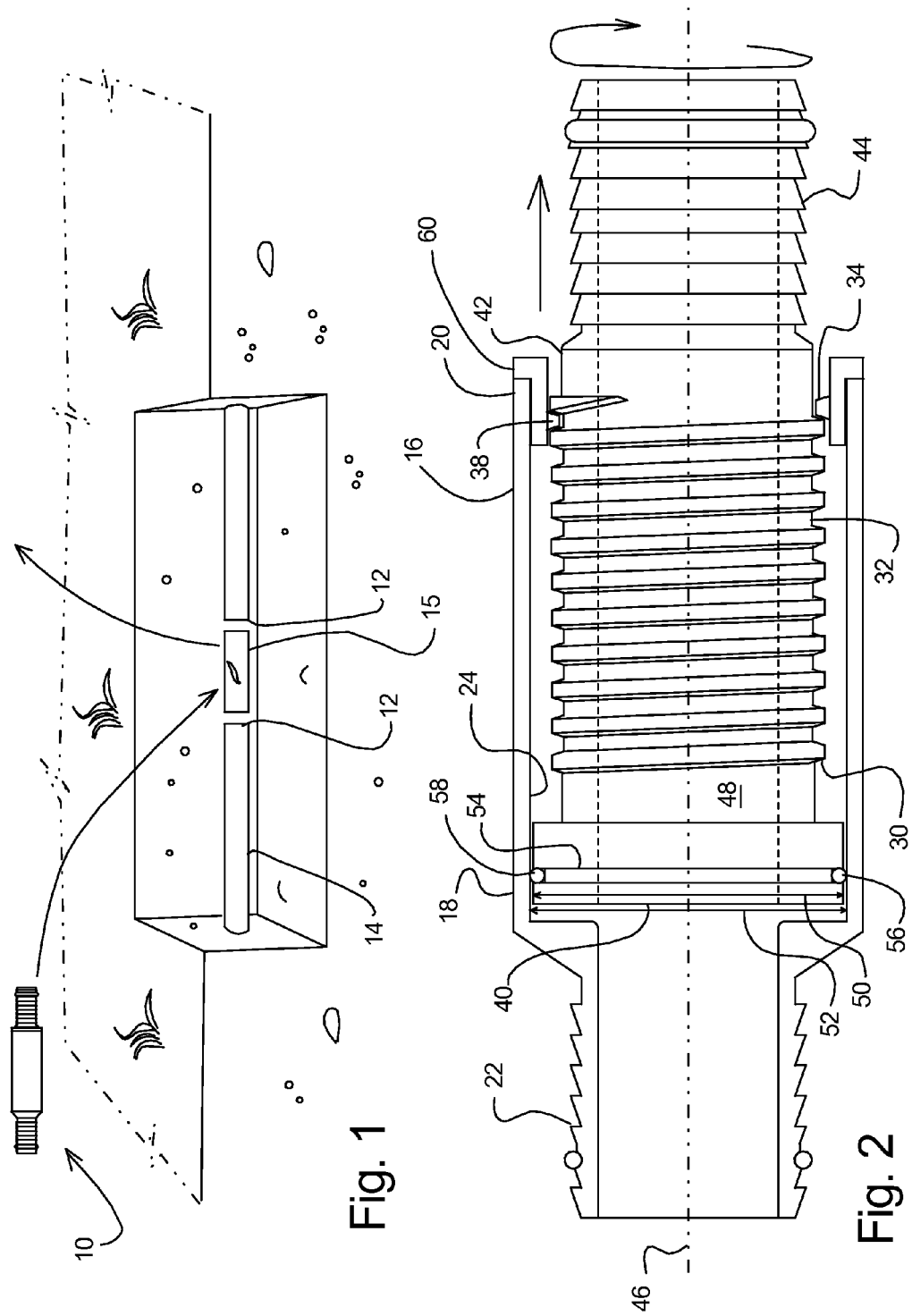

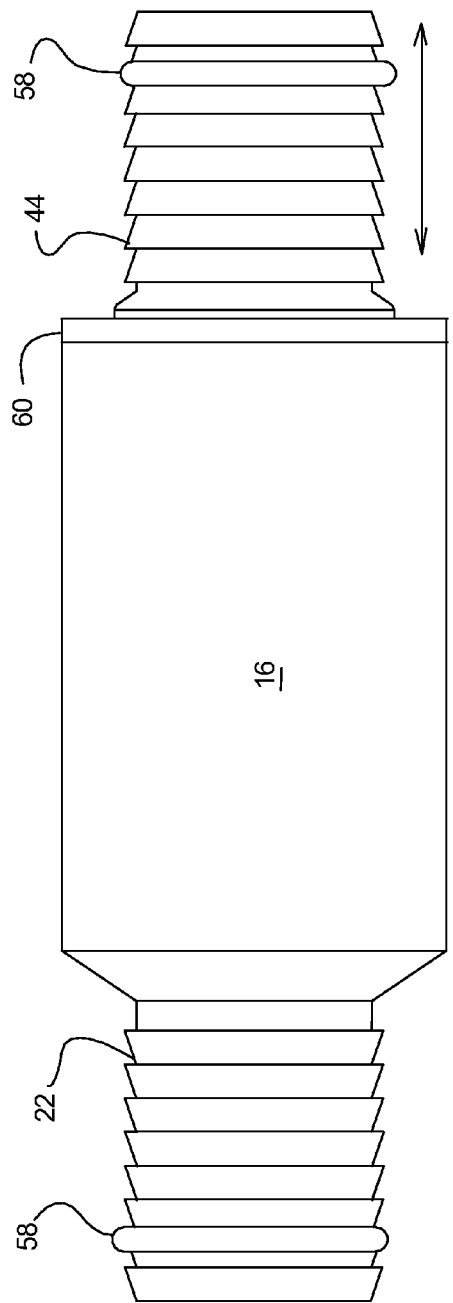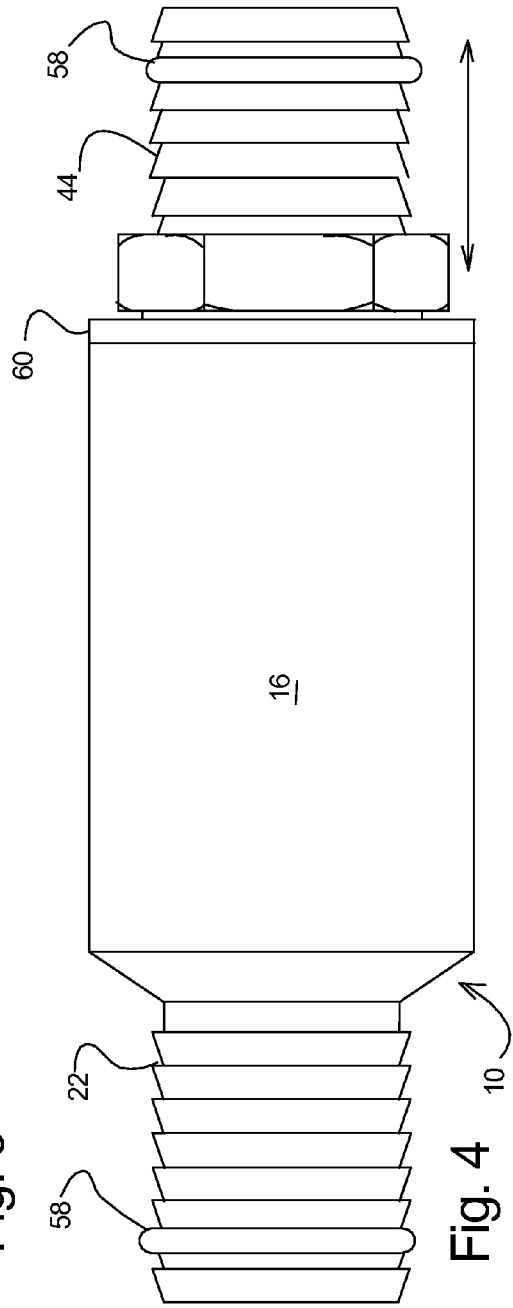
Fig. 3
Fig. 4

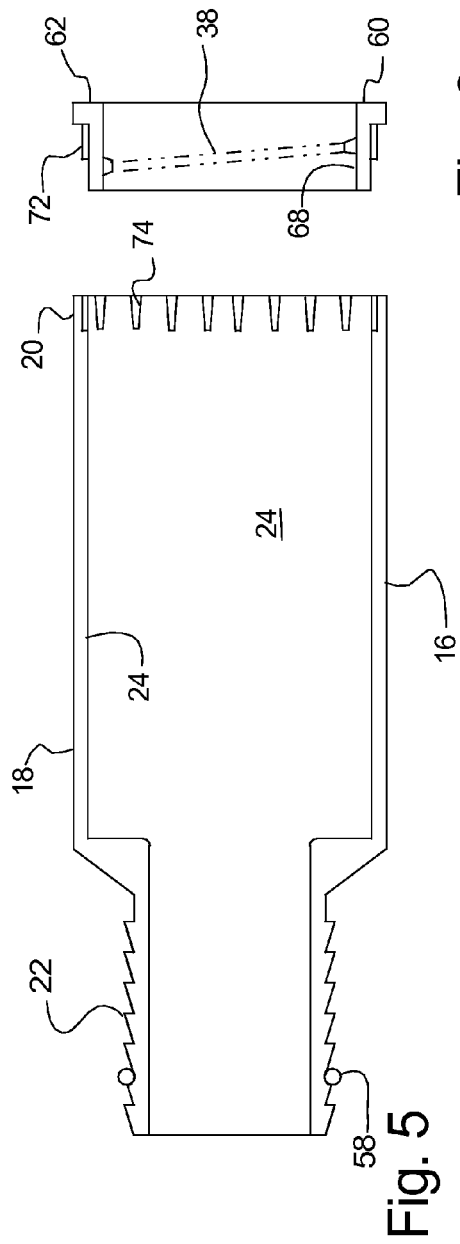
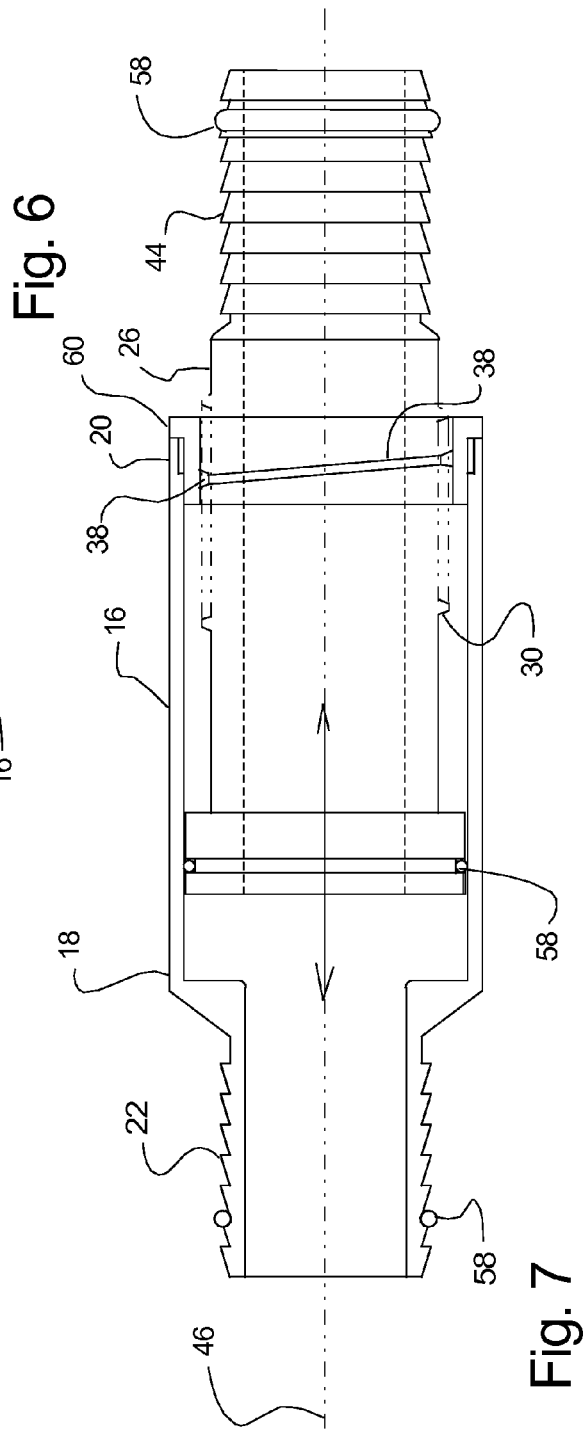

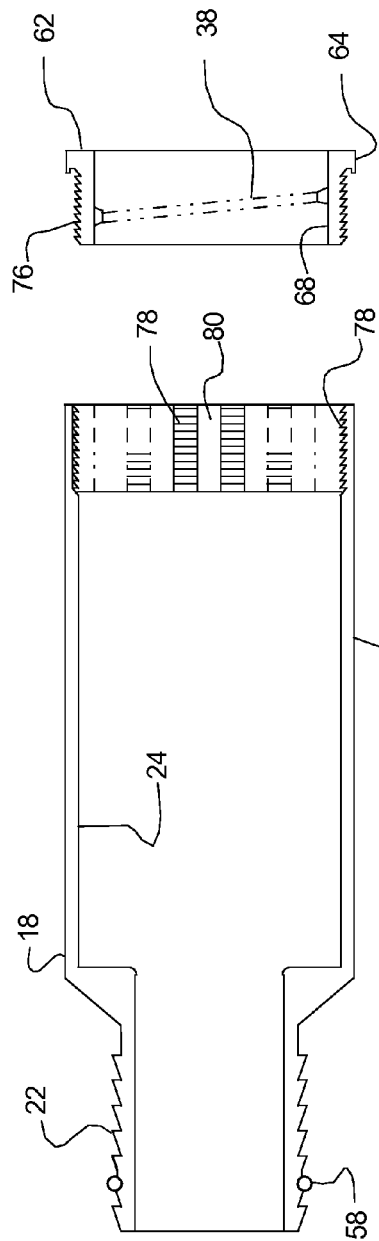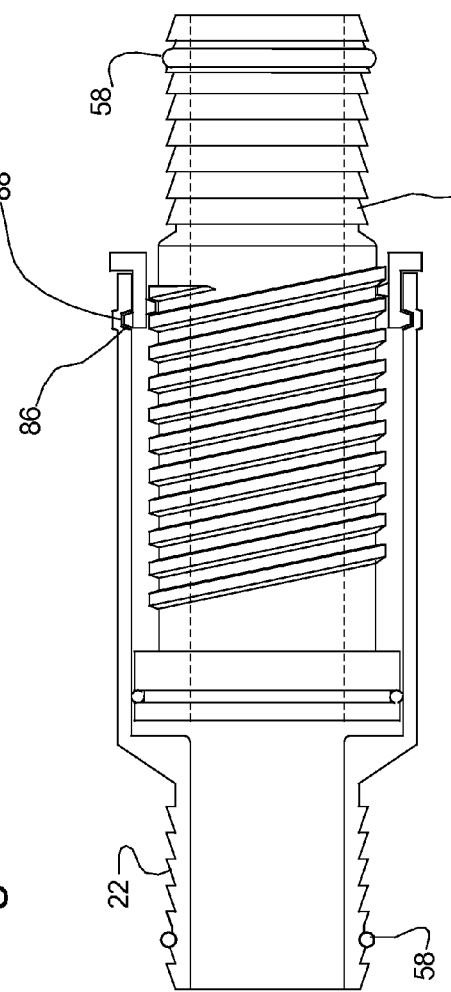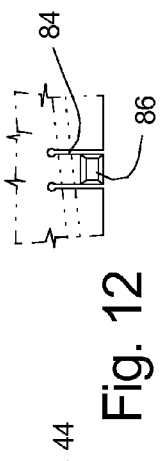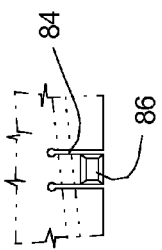

SPRINKLER SYSTEM COUPLER

BACKGROUND OF THE INVENTION (a) Field of the Invention

This application relates to a device and method for connecting sections of tubing used in underground sprinkler systems. More particularly, but not by way of limitation, to a telescoping coupler that includes a threaded portion that is used to extend the coupler in order to drive the ends of the coupler into the open ends of the sections of partially-buried tubing to be joined.

(b) Discussion of Known Art

For the reasons discussed in my U.S. Pat. Nos. 5,624,139 and 5,403,046, both of which are incorporated herein by reference in their entirety, polyethylene is widely used for the tubing or ducts that are used in forming underground sprinkler systems. The polyethylene tubing is tough and relatively stiff, so that it will not collapse due to the weight of the soil used to backfill the trench used to lay out the sprinkler system. The stiffness of the polyethylene tubing, however, creates problems whenever it is necessary to join two lengths or sections of polyethylene tube or hose. Often, the need to join sections presents itself when a section of the tubing or hose has developed a leak, such a leak from a hole caused by water that has been allowed to freeze in the tubing, or by mechanical damage caused while digging around the sprinkler system. To repair the leak, the damaged section must be removed, and the two remaining sections joined.

One common type of device for joining sections of tubing includes one-piece couplers such as the type disclosed in U.S. Pat. No. 1,996,855 to Cheswright. The use of types of couplers for joining sections of polyethylene tubing is common, but often leads to further damage to the tubing. This damage includes kinking sections of the tubing, with the kink creating a weakened section in the tubing, and significant distortions to the ends and inner diameter of the sections to be joined, such that inner diameter is enlarged to the point where a water-tight seal cannot be achieved. Many of the problems associated with making connections with devices such as the Cheswright device stem from the fact that to install the coupling, the installer very frequently has to insert the fitting into the first section of tubing, and then lift and try to gently bend the tubing in order to shorten that length of tubing enough to insert the remaining end of the fitting into the second section of tubing. Even if due care is exercised in the installation, while so bending the hose it often kinks, which substantially weakens the integrity of polyethylene hose. This in turn is likely to lead to future failures of the system.

My U.S. Pat. Nos. 5,624,139 and 5,403,046 solved the problems associated with the limited space between the sections of tubing, and thus greatly reduced, if not eliminated, the need to bend the tubing in order to install a fitting that would join two sections. My solutions disclosed in these patents solve the problems associated with space between the sections to be joined, but through years of use in the field it was discovered that it is often very difficult to insert the ends, or nipples, of the fittings into the polyethylene tubing sections to be joined. This problem is inherent to the repair of polyethylene tubing, simply due to the toughness and stiffness of polyethylene tubing.

Still further, an efficient mechanism for joining the components of the disclosed invention without using chemical solvents or ultrasonic welding is also needed.

Therefore, a review of known devices reveals that there remains a need for a simple device that facilitates the insertion of fittings used connect a pair of sections of polyethylene tubing that are partially buried.

SUMMARY

It has been discovered that the problems left unanswered by known art can be solved by providing a telescoping coupling for joining a pair of ends of sections of partially buried polymer tubing, the coupling includes:

An axial hollow outer member;

An axial hollow inner member that is telescopically mounted within the outer member;

A helical threaded connection between the axial hollow inner member and the axial hollow outer member; and A seal between the hollow inner member and the hollow outer member, so that twisting of the hollow inner member relative to the hollow outer member causes axial movement of the inner member relative to the outer member due to the threaded connection between the inner member and the axial hollow outer member.

According to a preferred example of the invention, the threaded connection is formed by helical threads on the outer surface of the hollow inner member and a mating set of threads on an end of the hollow outer member. Additionally, a nipple is incorporated onto the hollow outer member and another, opposite, nipple is incorporated onto the hollow inner member. This allows the user to insert one of the nipples into one of the sections of tubing, and then turn the inner member and outer member relative to one another so that the helical screw connection between the two sections causes the two members to move away from one another. This motion will thus cause the opposite nipple to be driven in to the remaining section of tubing.

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it should be clearly understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which:

FIG. 1 illustrates an example of the disclosed invention while in use.

FIG. 2 is a cross-sectional side view of an example of the disclosed invention.

FIG. 3 is a side view of the embodiment illustrated in FIG. 2, and

FIG. 4 is a side view of the embodiment illustrated in FIG. 3, with the addition of engagement surfaces that facilitate turning of the inner member relative to the outer member in order to cause the inner member to move away from the outer member.

FIG. 5 is a cross-sectional side view of the outer member.

FIG. 6 is a cross-sectional side view of the end cap used with an embodiment of the invention.

FIG. 7 is a side cross-sectional side view of an example of the disclosed invention, and illustrates movement of the inner member from the outer member, as compared to the relationship of the inner member and the outer member illustrated in FIG. 2.

FIG. 8 is a side cross-sectional side view of a preferred example of the disclosed invention, the view illustrating the use of an end cap with sections that contain teeth that are used to engage mating teeth found on the end cap, illustrated in FIGS. 9-10.

FIG. 9 is a side cross-sectional side view of the end cap that is used with the embodiment illustrated in FIG. 8.

FIG. 10 is an end view of the end cap illustrated in FIG. 9.

FIG. 11 is a side cross-sectional side view of another example of an end cap used with the disclosed invention, the embodiment allowing the end cap to rotate relative to the outer member in order to drive the inner member away from the outer member.

FIG. 12 shows the detail of the tab and knob shown in FIG. 11.

DETAILED DESCRIPTION OF PREFERRED EXEMPLAR EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Turning now to FIG. 1 where an example of a telescopic coupler 10 incorporating the inventive aspects disclosed herein has been illustrated while using the invention to join the ends 12 of sections of tubing 14. The tubing 14 is illustrated as being partially buried, and has been cut in order to remove a damaged section 15 that is being replaced with the disclosed telescopic coupler 10.

Turning now to FIG. 2 it will be understood that the disclosed telescopic coupler 10 will include an axial elongated hollow outer coupling member, simply referred to herein as the outer member 16 that has an outer member first end 18 and an outer member second end 20. Preferably, an outer member nipple 22 will extend from the outer member first end 18. Additionally, the outer member 16 will include an axial outer member aperture 24 that extends through the entire outer member 16. The outer member aperture has an outer member inner surface 24, which in a preferred embodiment is of a constant cross-section 25, and in a preferred example of the invention the aperture cross-section is circular.

FIG. 2 also illustrates that the disclosed invention will incorporate an axial hollow inner member 26 that has an outer surface 28 with helical thread 30, which include a helical recess 32. The helical thread 30 cooperates with at least one protrusion 34 that is supported from the outer member 16 to allow extension or retraction of the inner member 26 by rotating the outer member 16 relative to the inner member 26. The screw action cooperation between the inner member 26 and the outer member 16 may be accomplished with a simple protrusion 34, however in a preferred embodiment it is accomplished with a mating helical thread 38 that protrudes from the outer member inner surface 24 at a location near the outer member second end 20.

FIG. 2 also illustrates that a preferred embodiment of the inner member 26 will include an inner member first end 40, an inner member second end 42, and an inner member nipple 44. The inner member nipple is preferably mounted directly from inner member second end 42, such that the nipple extends from the inner member second end 42, with the entire assembly extending along an axis 46.

Referring to FIGS. 2 and 5 it will be understood that the inner member first end 40 will include an inner member outer surface 28 that has an outer surface cross-section 50 that is smaller than the outer member inner surface cross-section that is offset, or generally parallel, from the outer member inner surface 24. These figures also show that the hollow inner member 26 includes at groove 54 that accepts a seal 56, which in a preferred example is simply a suitable rubber O-ring 58. FIGS. 2 and 5 also illustrate that the threads 30 on the outer surface 28 of the inner member 26 extend between a location near the inner member second end 42 and a location near the inner member first end 40, and is adapted for accepting the threads 38 on the outer member 16.

The accompanying figures, and particularly FIGS. 5-12, show that it is contemplated that an end cap 60 that is fixedly attached to the second end 20 of the outer member 16 will be used to support the protrusion 34 or helical thread 38 that mates with the helical thread 30 that is mounted on the outer surface 28 of the inner member 30. The end cap 60 serves to close the second end 20 of the outer member 16, and retains the axial relationship between the inner member 26 and the outer member 16.

FIGS. 5-6 and 8-11 show various mechanisms that may be used to retain the end cap 60 against the second end 20 of the outer member 16. In the preferred example of the invention, the end cap 60 is a ring 62 with a brim section 64 and an engagement section 66. The engagement section 66 has a cylindrical inner portion 68 and an external portion 70. In the example shown in FIGS. 5 and 6, the engagement section 66 includes several raised peninsulas 72 that are mounted from the external portion 70. The raised peninsulas 72 create and interference fit with a set of mating recessed peninsular sections 74, which thus provide a large surface are for joining through ultrasonic welding or through the aid of a chemical solvent or adhesive.

Another approach at securing the end cap 60 against the second end 20 of the outer member 16, shown in FIGS. 8-10, uses a set of external teeth 76 that are used to engage inner teeth 78 that project from outer member 16 inner surface 24, near the second end 20 of the outer member. This arrangement allows the external teeth 76 on the end cap 60 to engage the inner teeth 78 on the outer member 16 when the end cap 60 is inserted into the second end 20 of the outer member 16, and thus securing the end cap 60 to the outer member 16 in the relationship shown in FIG. 2.

In another example of the manner of attaching the end cap 60 to the outer member second end 16 the engagement section 66 includes at least one recessed portion 80 that is next to a section of external teeth 76. Cooperating with the recessed portion 80 and the section of external teeth 76 will be an internal recessed portion 84 and the section of inner teeth 78 that is found on the inner surface 24 of the outer member 16. This arrangement will allow the user to attach the end cap 60 to the second end 20 of the outer member 16 by first inserting the section of inner teeth 78 into the internal recessed portion 78, which as shown in FIG. 8, will not have teeth. Thus, the end cap 60 will find little resistance as it is inserted into the second end 20 in this manner. Once the end cap 60 has been inserted such that the brim section 64 contacts the second end 20 of the outer member 16, the user will then rotate the end cap 60 to allow the external teeth 76 to mesh with the inner teeth 78 to retain the end cap 60 in place. A stop mechanism, such as a pin or a protrusion next to the inner teeth 78 or external teeth 76 may be used to avoid over rotating the end cap 60 relative to the second end 20 of the outer member 16, and thus preventing the un-meshing of the teeth.

FIGS. 11 and 12 show that a tab 84 that supports a cantilevered knob 86 is used in conjunction with a radial groove 88 to capture the end cap 60 from the second end 20 of the outer member 16. The tab 84 would deflect when inserting the cap 60 into the outer member 16, and then snap back into its original position once the knob 86 enters the radial groove 88, and thus retaining the cap from the second end 20 of the outer member 16. This arrangement would also allow rotation of the end cap 60 relative to the second end 20 to extend the inner member 26 from the outer member 6.

Thus it can be appreciated that the above-described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood that the foregoing and other modifications are exemplary only, and that equivalent changes in form and detail may be made without departing from the true spirit and scope of the invention as claimed, except as precluded by the prior art.

What is claimed is:

1. A coupler for joining sections of tubing, comprising:
a hollow outer coupling member having an outer member first end, an outer member second end, and an outer member aperture that extends between the first end and the second end, the outer member aperture having an outer member inner surface of a constant cross-section and at least one outer member protrusion that extends into the outer member aperture, the outer member protrusion being positioned near the outer member second end, said outer member protrusion being mounted from an end cap that is fixedly attached to the outer member, said end cap comprising a ring having a brim section and an engagement section, the engagement section having a cylindrical inner portion and an external portion, the external portion of the engagement section having a plurality of external teeth, and the outer member second end having an inner surface having a plurality of inner teeth, the external teeth being adapted for engaging the inner teeth, said external portion of the engagement section further comprises at least one raised lug portion having a top, and said inner member outer surface includes at least one recessed area adapted for accepting the raised lug portion, said external teeth being mounted on the top of the raised lug portion, and the inner teeth being mounted on the recessed area, so that when the end cap is inserted into the outer member second end the inner teeth engage the external teeth to retain the end cap against the inner member second end;
a hollow inner member that includes an inner member first end and an inner member second end, the inner member first end having an inner member outer surface that has an outer surface cross-section, the outer surface cross section being smaller than the outer member inner surface cross-section, the outer surface being adapted for being substantially parallel to the outer member inner surface when the hollow inner member first end is inserted into the outer member aperture; the hollow inner member further having at least one helical recess on the outer surface, the helical recess extending between a location near the inner member second end and a location near the inner member first end outer surface, the helical recess being adapted for accepting the outer member protrusion telescopically inside of said outer tubular coupling member; and
a seal positioned between the hollow inner member outer surface and the outer member inner surface, so that inserting the outer member protrusion into the helical recess and rotating the outer member relative to the inner member causes the inner member second end to move in an axial manner relative to the outer member.

2. A coupler according to claim 1 wherein said external portion of the engagement section comprises a plurality of raised lug portions, each raised lug portion having a top and each of said outer member inner surface include at least one recessed area adapted for accepting the raised lug portion, said external teeth being mounted on at least one of the tops of the raised lug portions, and the inner teeth being mounted on at least one of the recessed area.

3. A telescopic coupler for joining sections of tubing, comprising:
an axial elongated hollow outer coupling member having an outer member first end, an outer member second end, an outer member nipple that extends from the outer member first end, and an axial outer member aperture that extends through the hollow outer coupling member, the outer member aperture having an outer member inner surface of a constant cross-section and at least one outer member protrusion that extends from the outer member inner surface and into the outer member axial aperture at a location near the outer member second end, wherein said outer member protrusion is a helical thread that protrudes from an end cap that is fixedly attached to the outer member, said end cap comprising a ring having a brim section and an engagement section, the engagement section having a cylindrical inner portion and an external portion, the external portion of the engagement section having a plurality of external teeth, and the outer member second end having an inner surface having a plurality of inner teeth, the external teeth being adapted for engaging the inner teeth, so that when the end cap is inserted into the inner member second end the inner teeth engage the external teeth to retain the end cap against the inner member second end and thereby attaching end cap to the outer member, said external portion further comprising at least one raised lug portion having a top, and said inner member outer surface includes at least one recessed area adapted for accepting the raised lug portion, said external teeth being mounted on the top of the raised lug portion, and the inner teeth being mounted on the recessed area;
an axial hollow inner member that includes an inner member first end and an inner member second end, and an inner member nipple that extends from the inner member second end, the inner member first end having an inner member outer surface that has an outer surface cross-section, the outer surface cross section being smaller than the outer member inner surface cross-section and parallel to the outer member inner surface; the hollow inner member further having at least one helical recess on the outer surface, the helical recess extending between a location near the inner member second end and a location near the inner member first end outer surface, the helical recess being adapted for accepting the outer member protrusion telescopically inside of said outer tubular coupling member; and
a seal positioned between the hollow inner member outer surface and the outer member inner surface, so that inserting the outer member protrusion into the helical recess and rotating the outer member relative to the inner member causes the inner member second end to move in an axial manner relative to the outer member.

4. A coupler according to claim 3 wherein said external portion of the engagement section comprises a plurality of raised lug portions, each raised lug portion having a top and each of said outer member inner surface includes recessed areas adapted for accepting the raised lug portions, said external teeth being mounted on at least one of the tops of the raised lug portions, and the inner teeth being mounted on at least one of the recessed area.

\* \* \* \* \*